Oct. 9, 1956   F. E. SELIM   2,765,801
SAFETY SHUT-OFF VALVE
Filed Aug. 31, 1953
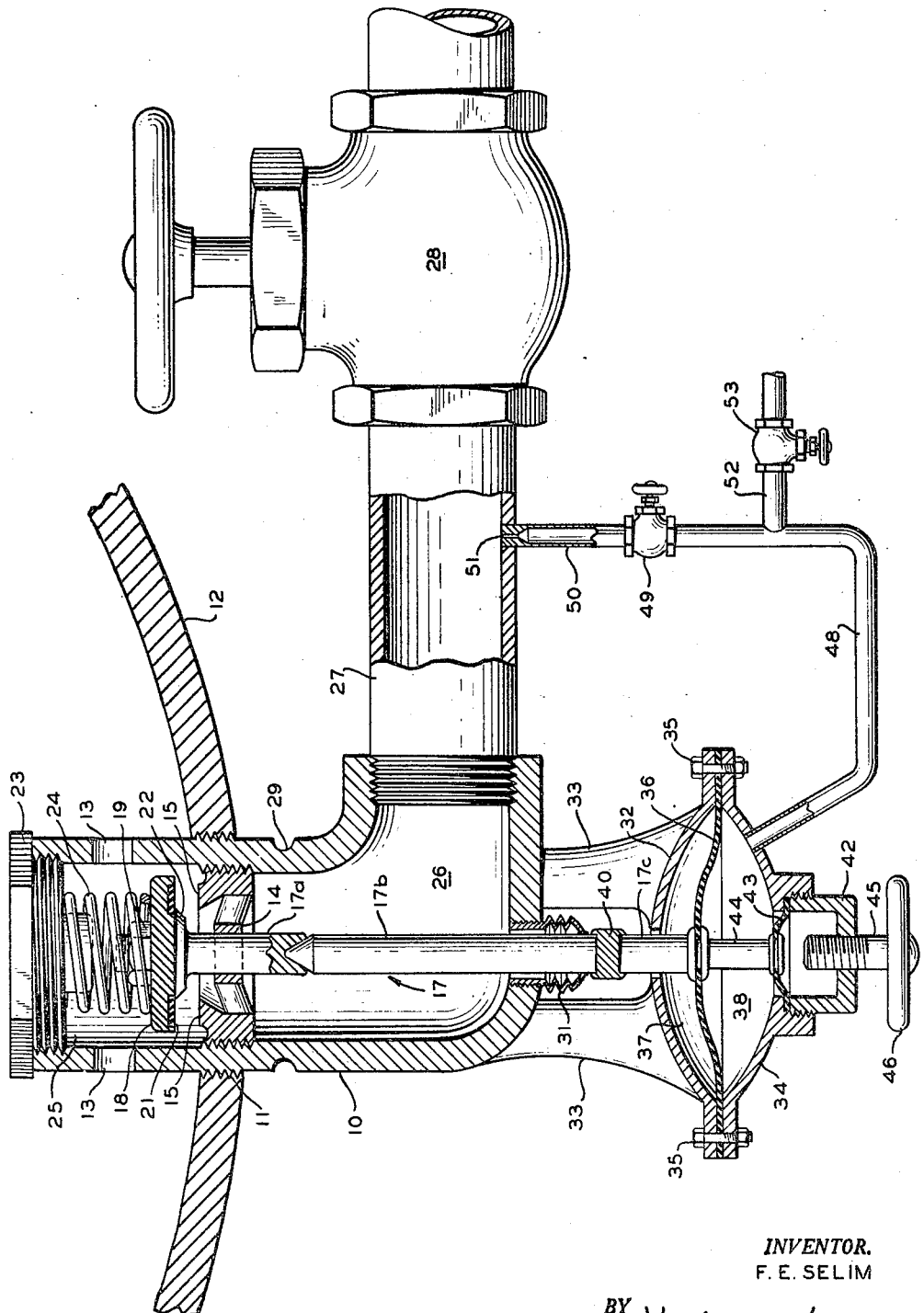
INVENTOR.
F. E. SELIM
BY Hudson & Young
ATTORNEYS United States Patent Office 2,765,801
Patented Oct. 9, 1956

2,765,801

SAFETY SHUT-OFF VALVE

Floyd E. Selim, Bartlesville, Okla., assignor to Phillips Petroleum Company, a corporation of Delaware Application August 31, 1953, Serial No. 377,299

4 Claims. (Cl. 137—71)

This invention relates to a safety shut-off valve for controlling fluid flows.

In the liquefied petroleum gas industry it is common practice to transport liquefied petroleum gases such as butane and propane in a tank car or a tank truck. The problem of loading and unloading such a tank car or truck quickly and safely is of considerable importance because in many instances the success of a liquefied petroleum gas business is dependent upon a quick and safe servicing of many small users of the liquefied gas. Furthermore, the transportation of a liquefied highly inflammable petroleum gas presents many safety problems. For example, broken or ruptured transfer lines, leaks, faulty pumps, or the like represent potential explosive and fire hazards which may be unnoticed by the operator of the tank car or truck until a fire or explosion has occurred. In view of these and other considerations it has become important for the liquefied petroleum gas industry to devise simple and safe control apparatus to prevent accidental escape of the liquefied gas into the atmosphere. The present invention is directed primarily toward providing an improved outlet valve for use with a gas tank or truck.

Accordingly, it is an object of this invention to provide a safety shut-off valve for use in a system handling liquefied gases or other fluids.

A further object is to provide a safety valve which operates to shut off the flow of fluid from a tank in the event of a leak in the outlet conduit system.

A further object is to provide a shut-off valve which operates to prevent the escape of fluid from the tank in the event of fire in the region of the tank.

The safety shut-off valve of the present invention comprises, generally, a valve body having an inlet opening communicating with the interior of the tank containing the fluid to be delivered. The valve head positioned within this body normally is spring biased against the valve seat, to prevent the flow of fluid through the valve. A segmented valve stem extends between the valve head and a flexible diaphragm, one side of which is exposed to atmospheric pressure. The second side of the diagphragm is in communication with the outlet opening of the valve body such that the pressure of fluids flowing through the valve is applied to the second side of the diaphragm. In this manner the valve stem is displaced to overcome the force of the spring, thereby retaining the valve in an open position. Means are providel to open the valve initially to allow pressure to build up on the second side of the diaphragm. The valve body is provided with an easily frangible section adjacent to the valve seat such that if the valve is damaged, the break will occure at a selected region, thereby closing the valve. The segmented valve stem includes a fusible link whereby the valve opening diaphragm force is broken if the valve stem is subjected to a temperature high enough to melt the link.

Other objects, advantages and features of this invention should become apparent from the following detailed description taken in conjunction with the accompanying drawing which is a view, shown partially in section, of the safety shut-off valve of this invention.

The safety valve of this invention comprises a valve body 10 which is provided with exterior threads 11 that enable the valve body to be threaded into a tank 12 which can contain liquefied petroleum gas. The upper portion of valve body 10 is provided with a plurality of inlet openings 13. A spider 14 is threaded into the interior of valve body 10 and the upper portion thereof forms an annular valve seat 15. Spider 14 is provided with a central passage through which is passed the upper portion 17a of a valve stem assembly 17. A valve head 18 is attached to the upper end of valve stem 17a by a nut 19 which is threaded to valve stem 17a. An annular valve disc 21 is fitted in a cavity in the lower face of valve head 18 and held in place by a valve disc retainer 22 which is attached to valve stem 17a. A cap 23 is threaded to the upper end of valve body 10 and a compression spring 24 is interposed between cap 23 and valve head 18. Spring 24 thereby functions to tend to retain valve head 18 in engagement with valve seat 15 to prevent the flow of fluid from the upper chamber 25 of valve body 10 into the lower chamber 26. An outlet conduit 27 is threaded to the lower portion of valve body 10 and a valve 28 is disposed therein.

The lower end of valve stem 17a is recessed to receive the upper end of the intermediate segment 17b of valve stem assembly 17. The portion of valve body 10 adjacent the connection between valve stems 17a and 17b is weakened by a groove 29 which encompasses the valve body. This provides a relatively easily frangible section of the valve body. The lower portion of valve stem 17b extends downwardly through the bottom of valve body 10 and is sealed therewith by suitable flexible member such as metallic bellows 31. An upper diaphragm housing 32 is suspended beneath valve body 10 by a plurality of supports 33. A lower diaphragm housing 34 is attached to upper diaphragm housing 32 by a plurality of bolts 35, and a diaphragm 36 is interposed between diaphragm housing 32 and 34 to form an upper diaphragm chamber 37 and a lower diaphragm chamber 38. The lower segment 17c of valve stem assembly 17 extends upwardly from diaphragm 36 and joins valve stem 17b through a link of fusible material 40. A housing 42 is threaded to lower diaphragm housing 34 and a diaphragm 43 is fitted between housings 34 and 42. A connecting rod 44 is attached to diaphragms 36 and 43 and extends therebetween. A threaded rod 45 is threaded in housing 42 and is adjustable therein by a hand wheel 46 such that rod 45 can engage the lower surface of diaphragm 43 to move connecting rod 44 upwardly.

A conduit 48 communicates with diaphragm chamber 38 at one end and with a valve 49 at the other end. A conduit 50 which has a narrow orifice 51 therein communicates between conduit 27 and the second opening of valve 49. A branch conduit 52 communicates at one end with conduit 48 and is provided with a bleed valve 53 at the opposite end thereof. Conduit 50 can communicate directly with valve body 10 if desired.

Valve head 18 normally remains seated on valve seat 15 by the combined forces of compression spring 24 and the pressure of the fluid in tank 12, which forces are exerted on the upper surface of valve head 18. When it is desired to open the safety valve, bleed valve 53 is closed and valve 49 is opened. Hand wheel 46 then is rotated to force rod 45 into engagement with diaphragm 43. This in turn raises connecting rod 44 and the valve stem assembly 17. The upward movement of the valve stem assembly overcomes the forces tending to retain valve head 18 in a seated position such that the valve is opened. Fluid from tank 12 then passes downwardly into chamber 26 and into diaphragm chamber 38 through conduits 27, 50 and 48. The fluid pressure in diaphragm chamber 38 acts over the area of diaphragm 36, thereby exerting a sufficient force on the diaphragm to overcome the force of compression spring 24. This retains valve head 18 in an open position so that rod 45 is no longer needed to keep the valve open, and as such hand wheel 46 is rotated to disengaged rod 45 from diaphragm 43. As will be pointed out hereinafter, this is an important operation because it establishes one of the basic safety features of the shut-off valve. Once the shut-off valve is opened, valve 28 can be opened whenever it is desired to remove fluid from tank 12. As long as pressure is retained in conduit 27, the safety shut-off valve will remain open because of this pressure being applied to diaphragm chamber 38.

The several safety features of this valve should now become apparent. If a break or leak should develop in the outlet conduit system, a pressure drop in conduit 27 results, and this in turn reduces the pressure in diaphragm chamber 38. Once the pressure in diaphragm chamber 38 is less than a predetermined value, the upward force exerted on diaphragm 36 becomes less than the downward force exerted by compression spring 24, such that valve head 18 is forced into engagement with valve seat 50 to shut off the flow through the safety valve. By suitable adjustment of the area in the diaphragm 36 and the force of compression spring 24, any desired degree of sensitivity can be achieved. The orifice 51 in conduit 50 is made as small as is convenient. Therefore, if a leak or break should occur in the conduit system connecting conduit 27 and diaphragm chamber 38, the fluid in this connecting conduit system leaks out faster than fluid enters the conduit system through orifice 51. This also reduces the pressure in diaphragm chamber 38 to shut off the safety valve.

A second safety feature of this valve assembly resides in the provision of the easily frangible section 29 of valve body 10. Thus if the valve assembly should be damaged by an external force, valve body 10 tends to break at groove 29. Such a break in valve body 10 releases the upward force exerted by segmented valve stem assembly 17 such that valve head 18 is closed by the force of compression spring 24. If valve body 10 should break at groove 29, the intermediate section 17b of valve stem assembly 17 is free to fall clear from the upper section 17a of valve stem assembly 17.

Still another important safety feature of the valve assembly of this invention resides in the provision of fusible link 40 between valve stem sections 17b and 17c. From an inspection of the drawing, it can be seen that link 40 is exposed directly to the atmosphere. Should a fire occur in the region of the valve assembly, or should the temperature become elevated to a dangerous value, link 40 melts to break the connection between valve stem sections 17b and 17c. This also eliminates the upward force on valve stem section 17a such that compression spring 24 restores valve head 18 to a seated position on valve seat 15. If desired, supports 33 and/or bolts 35 can be formed of a fusible material; this construction being either in addition to or as a supplement to fusible link 40.

It should be apparent from the foregoing description that various modifications in the details of construction can be made without departing from the scope of this invention. Bellows 31 and diaphragm 43, for example, are merely illustrative of convenient methods of providing a flexible seal between the valve stem assembly and the adjacent housing assemblies. Thus, while the invention has been described in conjunction with a present preferred embodiment, it is obvious that the invention is not limited thereto.

What is claimed is:

1. A safety shutoff valve comprising, in combination, a valve body having inlet and outlet openings therein, a valve seat positioned within said body, a valve head engageable with said valve seat to divide said valve body into first and second chambers, said first chamber being in communication with said inlet opening and said second chamber being in communication with said outlet opening, said valve head operatively disposed in said first chamber, a resilient means in said first chamber urging said valve head into engagement with said valve seat, a housing positioned adjacent said valve body, a diaphragm dividing said housing into third and fourth chambers, said third chamber being in communication with the atmosphere, said diaphragm secured to said housing so as to positively seal said fourth chamber from the atmosphere, a valve stem depending from said second chamber into said third chamber, one end of said valve stem engaging said valve head and the other end engaging said diaphragm, said valve stem having an intermediate portion exterior to said valve body and said housing, a fusible member forming a part of said intermediate portion of said valve stem so as to be exposed to the ambient temperature whereby the connection between said valve head and said diaphragm is broken when said ambient temperature causes the temperature of said fusible member to rise to a predetermined value, a valved conduit means connecting said fourth chamber with said second chamber whereby the fluid pressure in said second and fourth chambers when said valve head is off said valve seat exerts a force on said diaphragm sufficient to overcome the force of said resilient means on said valve head whereby said valve head is retained off said valve seat, said conduit means having a restriction therein, and adjustable means opposing said resilient means to move said valve head initially off said valve seat.

2. A safety shutoff valve comprising, in combination, a valve body having inlet and outlet openings therein, a valve seat positioned within said body, a valve head engageable with said valve seat to divide said valve body into first and second chambers, said valve head operatively disposed in said first chamber, said first chamber being in communication with said inlet opening and said second chamber being in communication with said outlet opening, resilient means in said first chamber positioned to retain said valve head in engagement with said valve seat, an easily frangible section in that part of said valve body defining in part said second chamber adjacent said valve seat, said frangible section disposed to divide said valve body into upper and lower valve body portions whereby the latter falls free from the former when said valve body is broken at said frangible section, a segmented valve stem depending from said second chamber, one end of said valve stem being in engagement with said valve head and the second end being exterior to said valve body, the portion of said valve stem adjacent said easily frangible section of said valve body being separable, means adapted to engage said second end of said valve stem to exert a force on said valve head in opposition to said resilient means tending to retain said valve head in engagement with said valve seat, and a fusible member forming a part of said stem and movable therewith, said fusible member being exterior to said valve body and exposed to the ambient temperature whereby the connection between said valve head and said last-mentioned means is broken when the temperature of said fusible member is raised by said ambient temperatures to a predetermined value.

3. A safety shutoff valve comprising, in combination, a valve body having inlet and outlet openings therein, a valve seat positioned within said body, a valve head engageable with said valve seat to divide said valve body into first and second chambers, said valve head disposed in said first chamber, said first chamber being in communication with said inlet opening and said second chamber being in communication with said outlet opening, resilient means in said first chamber positioned to retain said valve head in engagement with said valve seat, an easily frangible section in that part of said valve body defining in part said second chamber adjacent said valve seat, said frangible section disposed to divide said valve body into upper and lower valve body portions, a housing positioned adjacent said valve body, a diaphragm dividing said housing into third and fourth chambers, said third chamber being in communication with the atmosphere, said diaphragm secured to said housing so as to positively seal said fourth chamber from the atmosphere, a segmented valve stem depending from said second chamber into said third chamber, one end of said valve stem engaging said valve head and the other end engaging said diaphragm, the portion of said valve stem adjacent said easily frangible section of said valve body being separable, said valve stem having an intermediate portion exterior to said valve body and said housing, a fusible member forming a part of said intermediate portion of said valve stem so as to be exposed to the ambient temperature whereby the connection between said valve head and said diaphragm is broken when said ambient temperature causes the temperature of said fusible member to rise to a predetermined value, a valved conduit means connecting said fourth chamber with said second chamber whereby the fluid pressure in said second and fourth chambers when said valve head is off said valve seat exerts a force on said diaphragm sufficient to overcome the force of said resilient means on said valve head whereby said valve head is retained off said valve seat, said conduit means having an orifice therein, and adjustable means opposing said resilient means to move said valve head initially off said valve seat, said lower valve body portion and said housing disposed to fall free from said upper valve body portion when said valve body is broken at said frangible section.

4. A safety shutoff valve comprising, in combination, a valve body having inlet and outlet openings therein, a valve seat positioned within said body, a valve head engageable with said valve seat to divide said valve body into first and second chambers, said valve head disposed in said first chamber, said first chamber being in communication with said inlet opening and said second chamber being in communication with said outlet opening, a cap positioned across the end of said valve body adjacent said first chamber, a compression spring interposed between said cap and said valve head to retain said valve head in engagement with said valve seat, an easily frangible section in that part of said valve body defining in part said second chamber adjacent said valve seat, said frangible section dividing said valve body into an upper valve body portion and a lower valve body portion, a housing positioned adjacent said valve body, a diaphragm dividing said housing into third and fourth chambers, said third chamber being in communication with the atmosphere, said diaphragm secured to said housing so as to positively seal said fourth chamber from the atmosphere, a segmented valve stem depending from said second chamber into said third chamber, one end of said valve stem engaging said valve head and the other end engaging said diaphragm, the portion of said valve stem adjacent said easily frangible section of said valve body being separable, said valve stem having an intermediate portion exterior to said valve body and said housing, a fusible member forming a part of said intermediate portion of said valve stem so as to be exposed to the ambient temperature whereby the connection between said valve head and said diaphragm is broken when said ambient temperature causes the temperature of said fusible member to rise to a predetermined value, an adjustable rod extending through said fourth chamber to engage said diaphragm to move said valve head initially off said valve seat, and an outlet conduit connected to said outlet opening, a valved conduit having an orifice therein communicating between said fourth chamber and said outlet conduit whereby the fluid pressure in said outlet conduit and said fourth chamber when said valve head is off said valve seat exerts a force on said diaphragm sufficient to overcome the force of said resilient means on said valve head to retain said valve head off said valve seat, a second valved conduit communicating between said fourth chamber and the atmosphere, said housing and said lower valve body portion disposed to fall free from said upper valve body portion when said valve body is broken at said frangible section.

References Cited in the file of this patent

UNITED STATES PATENTS

| Number | Name | Date |
|---|---|---|
| 370,339 | Johnston | Sept. 20, 1887 |
| 688,863 | Kemp | Dec. 17, 1901 |
| 1,033,700 | Hustead | July 23, 1912 |
| 1,924,356 | Glab | Aug. 29, 1933 |
| 1,960,272 | Lovekin | May 29, 1934 |
| 2,048,387 | Johnsen | July 21, 1936 |